UNITED STATES PATENT OFFICE.

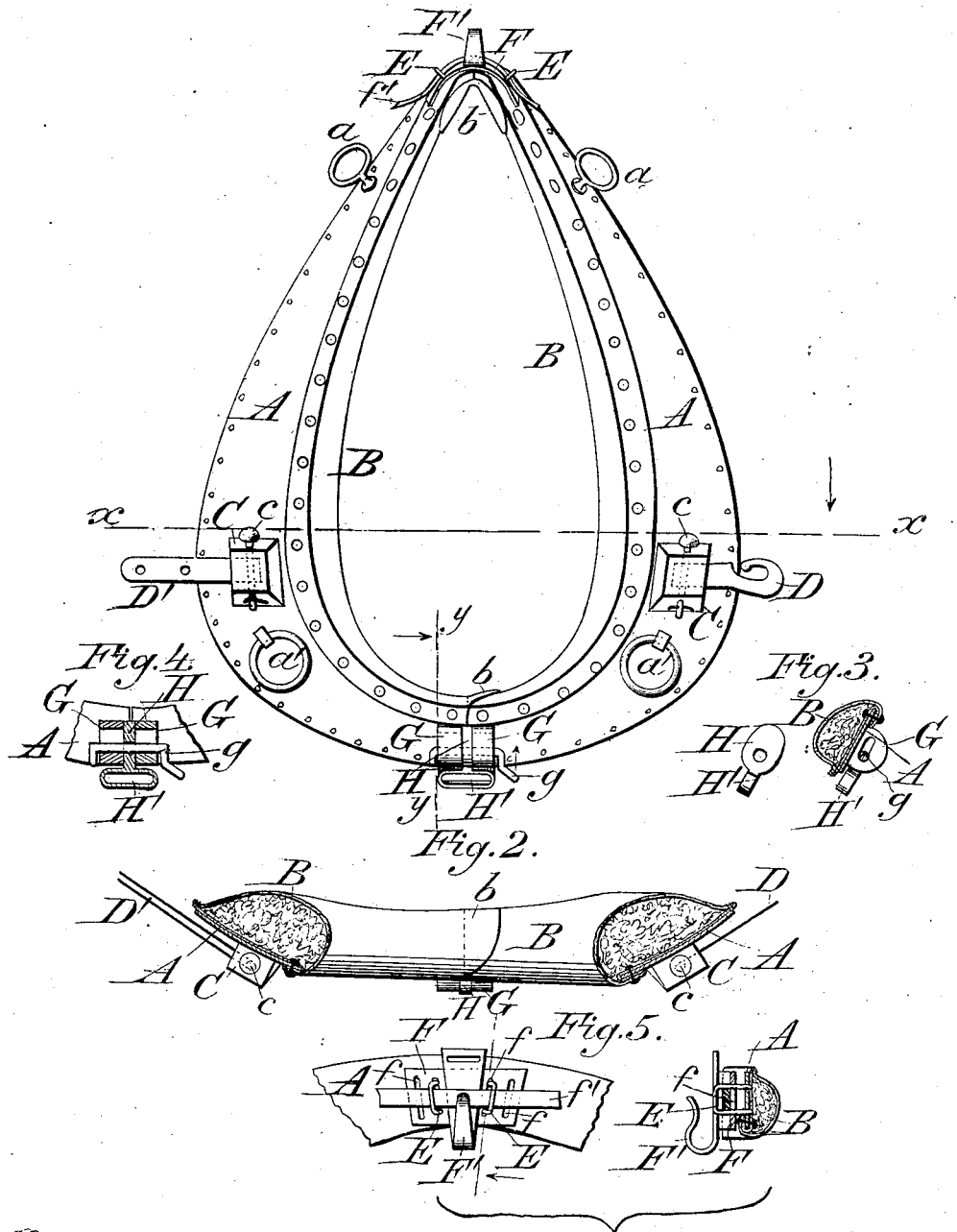

WILLIAM P. GELABERT AND ERNST H. STEINKUHLER, OF BROWNSVILLE, MISSOURI.

HAME-FASTENER.

SPECIFICATION forming part of Letters Patent No. 243,882, dated July 5, 1881.

Application filed April 5, 1881. (No model.)

*To all whom it may concern:*

Be it known that we, WILLIAM P. GELABERT and ERNST H. STEINKUHLER, of Brownsville, in the county of Saline and State of Missouri, have invented certain new and useful Improvements in Hame-Fasteners; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

The object of this invention is to provide a simple and ready means of adjusting the fastenings of a combined collar and hames so as to vary the size of the collar; and the invention consists in the combination and arrangement of parts, as hereinafter more fully described and claimed.

In the annexed drawings, which fully illustrate the invention, Figure 1 is a front view of the combined collar and hames. Fig. 2 is a section on the line $x\,x$. Fig. 3 is a section on the line $y\,y$. Fig. 4 is a detail sectional view of the lower fastening, and Fig. 5 is a plan and section of the top fastening.

The hames A A are made of any suitable metal, and attached by rivets or otherwise to the collar B, which is stuffed or padded in the usual manner, as shown in section. To the hames are attached the usual rings, $a\,a$, for the passage of the driving-reins, and also rings $a'\,a'$ for the attachment of another horse. On each hame is a socket, C, in which is pivoted the brace-hook D or the clip D', as desired, the hook or clip being secured in place by the pins $c\,c$, so as to be readily detached or changed one for the other when required. The collar B is divided at the top and bottom to correspond with the hames, and is provided with the flaps $b\,b$, that serve to prevent chafing.

At the upper end of each hame is a staple, E, that engages with one of several slots in the fastening-plate F. The plate F may be of any desired length. It is curved to fit the ends of the hames, and is provided with a number of slots, $f$, that engage with the staples E E, so that they may be secured together or adjusted at any distance apart that may be desired. After the plate F has been adjusted in the required position it is secured by the strap $f'$, which is passed through the staples, so as to hold the plate in place. A buckle may be attached to the strap $f'$, if desired.

F' is a check-hook that is attached to the plate F.

On the lower end of each hame is a lug, G, which is perforated for the passage of the bent pin $g$, that also passes through a perforation in the lug H, which lies between the lugs G G, and carries a loop, H', for the attachment of the breast-strap. In this way the lower ends of the hames are detachably united, so as to be readily adjusted tight or loose, as required.

It will be seen that the collar and hames constructed as above described may be easily adjusted so as to vary the size, according to circumstances.

The hames may be used with an ordinary pad or collar; or the collar may be attached permanently, as described, and in any suitable manner, by stitches and rivets. Its construction is such that increased durability and strength are combined with lightness and economy of material.

Having thus described our invention, what we claim as new, and desire to secure by Letters Patent, is—

1. The combination of the hames A A, having staples E E, fastening-plate F, provided with slots $f\,f$, adapted to engage with said staples, and the strap $f'$, for securing the hames and fastening-plate at any desired point, substantially as specified.

2. The combination, with the hames A A, having perforated lugs G G, of the lug H, having loop H' and the bent pin $g$, substantially as and for the purpose set forth.

In testimony that we claim the foregoing as our own we have hereto affixed our signatures in presence of two witnesses.

WILLIAM P. GELABERT.
ERNST H. STEINKUHLER.

Witnesses:
F. D. MILLER,
A. S. REMBURT.